United States Patent [19]
Swintek

[11] Patent Number: 5,528,025
[45] Date of Patent: Jun. 18, 1996

[54] APPARATUS AND METHOD FOR THE WIRELESS EXCHANGE OF BAR CODE DATA

[76] Inventor: William P. Swintek, 10392 Lasondas Way, Cupertino, Calif. 95014

[21] Appl. No.: 315,585

[22] Filed: Sep. 30, 1994

[51] Int. Cl.$^6$ .................................................. G06K 7/10
[52] U.S. Cl. ............................................ 235/472; 235/375
[58] Field of Search ................................ 235/472, 375; 375/1

[56] References Cited

U.S. PATENT DOCUMENTS

| | | |
|---|---|---|
| 4,644,143 | 2/1987 | McJohnson et al. . |
| 4,953,113 | 8/1990 | Chadima, Jr. et al. . |
| 4,995,053 | 2/1991 | Simpson ........................... 375/1 |
| 5,059,778 | 10/1991 | Zouzoulas et al. . |
| 5,157,687 | 10/1992 | Tymes . |

*Primary Examiner*—Harold Pitts
*Attorney, Agent, or Firm*—Flehr, Hohbach, Test, Albritton & Herbert

[57] ABSTRACT

A retrofit apparatus is connected to an existing bar code inventory system that includes a bar code corresponding to bar code markings, a bar code wedge to reader to generate a set of digital output signals transform the digital output signals into corresponding computer data characters, and a computer connected to the bar code wedge to process the computer data characters. A mobile transceiver is connected to the bar code reader. The mobile transceiver transmits wireless bar code signals corresponding to the digital output signals from the bar code reader. A receiver in the mobile transceiver is activated for a predetermined period of time after the wireless bar code signals are transmitted. A base transceiver is connected to the bar code wedge to receive the wireless bar code format output signals and to link them to the computer through the bar code wedge. If the computer receives a valid signal, it generates an acknowledge signal that is passed through the bar code wedge to the base transceiver. The base transceiver transmits a corresponding wireless acknowledge signal. The mobile transceiver receives the wireless acknowledge signal during the predetermined period that the receiver is activated. The bar code reader is powered by the mobile transceiver and the base transceiver is powered by the bar code wedge.

11 Claims, 4 Drawing Sheets

APPARATUS AND METHOD FOR THE WIRELESS EXCHANGE OF BAR CODE DATA

BRIEF DESCRIPTION OF THE INVENTION

This invention relates generally to bar code inventory systems. More particularly, this invention describes an apparatus and method to retrofit existing bar code inventory systems for the wireless exchange of bar code data.

BACKGROUND OF THE INVENTION

Bar code inventory systems are known in the art. These systems process bar code data that are affixed to different types of objects, such as product packages. The bar code data includes a set of vertical lines of varying widths. A bar code inventory system includes a bar code reader, such as a light pen or scan gun, that transforms the vertical lines (printed bars and spaces between them) of the bar code label into a set of digital high and low pulses of varying duration, corresponding to the varying widths of the vertical lines of the bar code label.

Known stationary bar code inventory systems include an interface device, also often called a bar code wedge in the industry, that is connected between the bar code reader and a computer. The bar code wedge is typically tethered to the bar code reader by a flexible electrical cord. This allows an individual to move the bar code reader to any position within the range of the flexible cord. The information obtained from the bar code reader is transmitted through the flexible electrical cord to the bar code wedge. The bar code wedge transforms the information into a character set, such as ASCII, that may be processed by a computer. Connection between the bar code wedge and the computer may be accomplished through a serial port of the computer or through a keyboard input port.

A shortcoming of prior art bar code inventory systems is that they are not readily portable. That is, the computer and bar code wedge of the system mitigate against portable operation of the system. Some portability is afforded by the bar code reader being attached to the wedge with a flexible electrical cord. However, the length of such a cord has practical limits. For example, if one is using a bar code inventory system in a warehouse, a long flexible electrical cord may create a hazard for individuals working in the warehouse. In addition, a long flexible electrical cord will also be susceptible to damage from equipment, such as fork lifts, operating in the warehouse.

Consequently, it would be highly desirable to provide a bar code inventory system that is not positionally constrained by a physically tethered bar code reader. Such a system would preferably provide instantaneous communication between a bar code reader and a base computer. In such a configuration, the bar code reader could rely upon immediate feedback from the base computer and therefore operate as a tethered bar code reader. Ideally, such a system would operate with existing bar code inventory systems and thereby not necessitate the costly replacement of one bar code inventory system for another.

SUMMARY OF THE INVENTION

The invention is a retrofit apparatus for connection to an existing bar code inventory system that includes a bar code reader to generate a set of output signals corresponding to bar code markings, a bar code wedge (an interface device) to transform the output signals into corresponding computer data characters, and a computer connected to the bar code wedge to process the computer data characters. In keeping with the invention, a mobile transceiver is connected to the bar code reader. The mobile transceiver transmits wireless bar code signals corresponding to digital output signals received from the bar code reader. The wireless bar code signals constitute a self-correcting code. That is, the output of the bar code reader has a constant ratio of mark and space elements. If the information that is processed does not have the proper ratio, it is presumed to be erroneous. Because of this error checking, it is more reliable than standard ASCII and packet transmitters operating under radio frequency interference conditions. Thus, with the wireless bar code format of the invention, traditional wireless communication handshakes, check bits, or other protocols are not required.

A receiver in the mobile transceiver is activated for a predetermined period of time after the wireless bar code signals are transmitted. A base transceiver is located to receive the wireless bar code format output signals and to link them to a computer through a bar code wedge if a valid signal is received. The wedge generates an acknowledge signal that is passed to the base transceiver. The base transceiver transmits a corresponding wireless acknowledge signal. The mobile transceiver receives the wireless acknowledge signal during the predetermined period that its receiver is activated. The bar code reader is powered by the mobile transceiver and the base transceiver is powered by the bar code wedge.

The apparatus allows un-tethered freedom for the bar code reader. The apparatus provides instantaneous communication between the bar code reader and the base computer. Consequently, the bar code reader effectively operates as a tethered device. The retrofit nature of the apparatus allows it to be used with existing bar code inventory systems and thereby provides an improved system without the expense of replacing the existing system.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
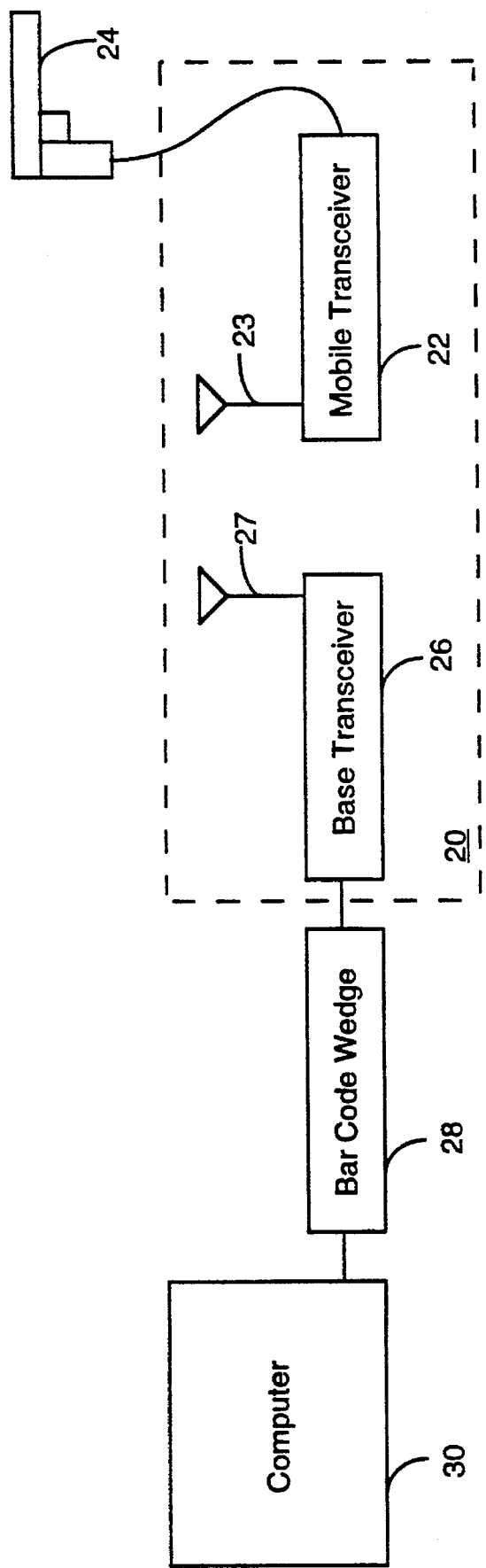
FIG. 1 illustrates a preferred embodiment of the retrofit wireless bar code data exchange apparatus of the invention.

An embodiment of the retrofit wireless bar code data exchange apparatus 20 of the invention is illustrated in FIG. 1. The apparatus 20 includes a mobile transceiver 22 with an antenna 23. The mobile transceiver 22 is connected to a bar code reader 24. Digital output signals from the bar code reader 24 are processed by the mobile transceiver 22 which then transmits wireless bar code signals corresponding to the digital output signals from the bar code reader 24.

The apparatus 20 also includes a base transceiver 26 with an antenna 27. The base transceiver 26 receives the wireless bar code signals transmitted from the mobile transceiver 22 and conveys the signals, by a physical electrical connection, to a bar code wedge 28. The bar code wedge 28 generates computer data characters that are passed to a computer 30 for processing in a conventional manner.

Bar code inventory systems of the prior art have a direct physical connection between the bar code wedge 28 and the bar code reader 24. The present invention uses standard connectors so that the prior art physical connection between the bar code wedge 28 and the bar code reader 24 is replaced by a physical connection between the mobile transceiver 22 and the bar code reader 24, and a physical connection between the bar code wedge 28 and the base transceiver 26. This feature allows the seamless integration of the apparatus of the invention into an existing bar code inventory system. That is, the connections of an existing bar code inventory system are used with a preferred embodiment of the invention. Moreover, existing bar code inventory systems will operate in the same manner, except for the feature that there is no longer a physical connection between the bar code wedge 28 and the bar code reader 24. It should be appreciated that such an arrangement provides greater flexibility in the use of the bar code reader 24. That is, the mobile transceiver 22 does not have to be tethered to the bar code wedge 28. Additional benefits associated with the system include a feature wherein the bar code reader 24 may be powered from the mobile transceiver 22 and the base transceiver 26 may be powered from the bar code wedge 28.

The general nature and advantages of the invention have now been described. Attention presently turns to a more detailed discussion of the method and apparatus of the invention.

Figure 2:
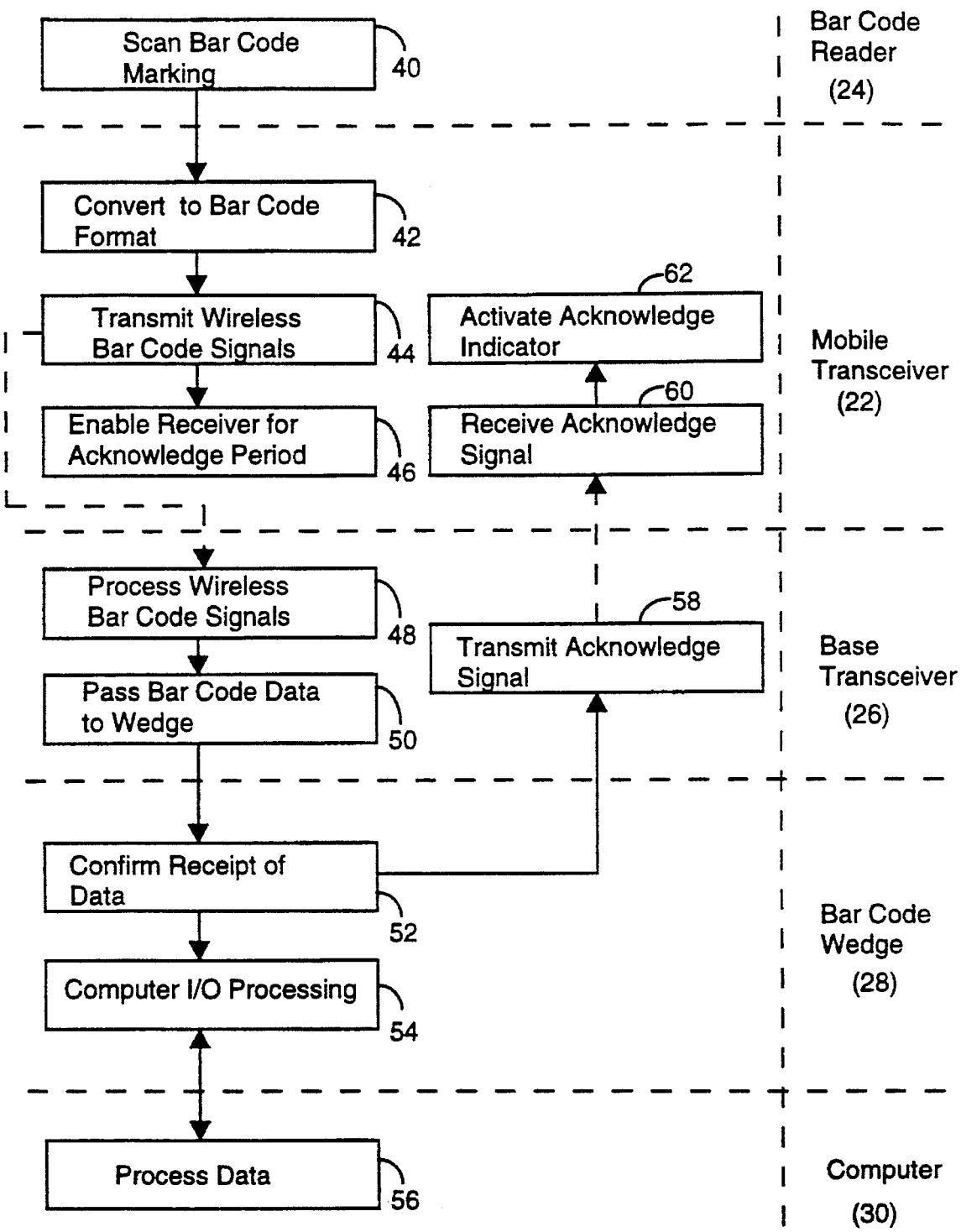
FIG. 2 illustrates the method of operation of the apparatus of FIG. 1.

FIG. 2 illustrates the processing steps associated with a bar code inventory system that incorporates the preferred embodiment of the retrofit wireless bar code data exchange apparatus of the invention. The figure illustrates the operation performed by each component associated with a bar code inventory system.

A bar code reader 24 is used to scan bar code markings to produce digital output signals (block 40). The digital output signals are passed to the mobile transceiver 22. The mobile transceiver 22 initially converts the digital output signals to bar code format signals (block 42). Most existing bar code inventory systems use a bar code reader 24 that provides digital signals that are not in a bar code format. Thus, the mobile transceiver 22 of the invention provides the required conversion of the digital signals to a bar code format. However, it should be appreciated that the invention is equally applicable to a bar code reader 24 that provides bar code format signals. Bar code format signals are critical to the wireless transmission operations of the invention, as will be described below.

In either embodiment, the next operation performed by the mobile transceiver 22 is to transmit wireless bar code signals corresponding to the bar code format signals (block 44). After this operation is executed, a receiver within the mobile transceiver 22 is enabled for a predetermined period of time to receive an acknowledge signal (block 46).

The transmitted wireless bar code signals are processed by the base transceiver 26 (block 48). The signals are then passed in a standard format to the bar code wedge 28 (block 50). The bar code wedge 28 generates an acknowledgement signal (block 52) that is passed back to the base transceiver 26. The bar code wedge 28 also performs standard computer input/output processing (block 54) by converting the bar code signals to a known character set, such as ASCII or an integer set. The computer 30 then processes the character set (block 56).

As previously indicated, a confirmation signal is sent from the bar code wedge 28 to the base transceiver 26. Thereafter, the base transceiver 26 transmits a wireless acknowledge signal (block 58).

The acknowledge signal is received by the mobile transceiver 22 (block 60) during the predetermined period of time that the receiver of the mobile transceiver 22 is activated. Finally, an acknowledge indicator on the mobile transceiver 22 is activated (block 62) so that the operator of the bar code reader knows that the bar code wedge 28 has received valid data for computer 30.

The methodology disclosed in FIG. 2 is particularly advantageous because the bar code format itself has a constant ratio of mark and space elements that is transmitted. Consequently, a complicated communication protocol is not required between the mobile transceiver 22 and the base transceiver 26. That is, the bar code format is self-correcting. If the base transceiver does not receive a valid bar code signal, then an acknowledgement is never sent back to the mobile transceiver 22. Unlike serial ASCII or packet protocols, no additional communication handshakes, check bits, or other information exchange is required.

Figure 3:
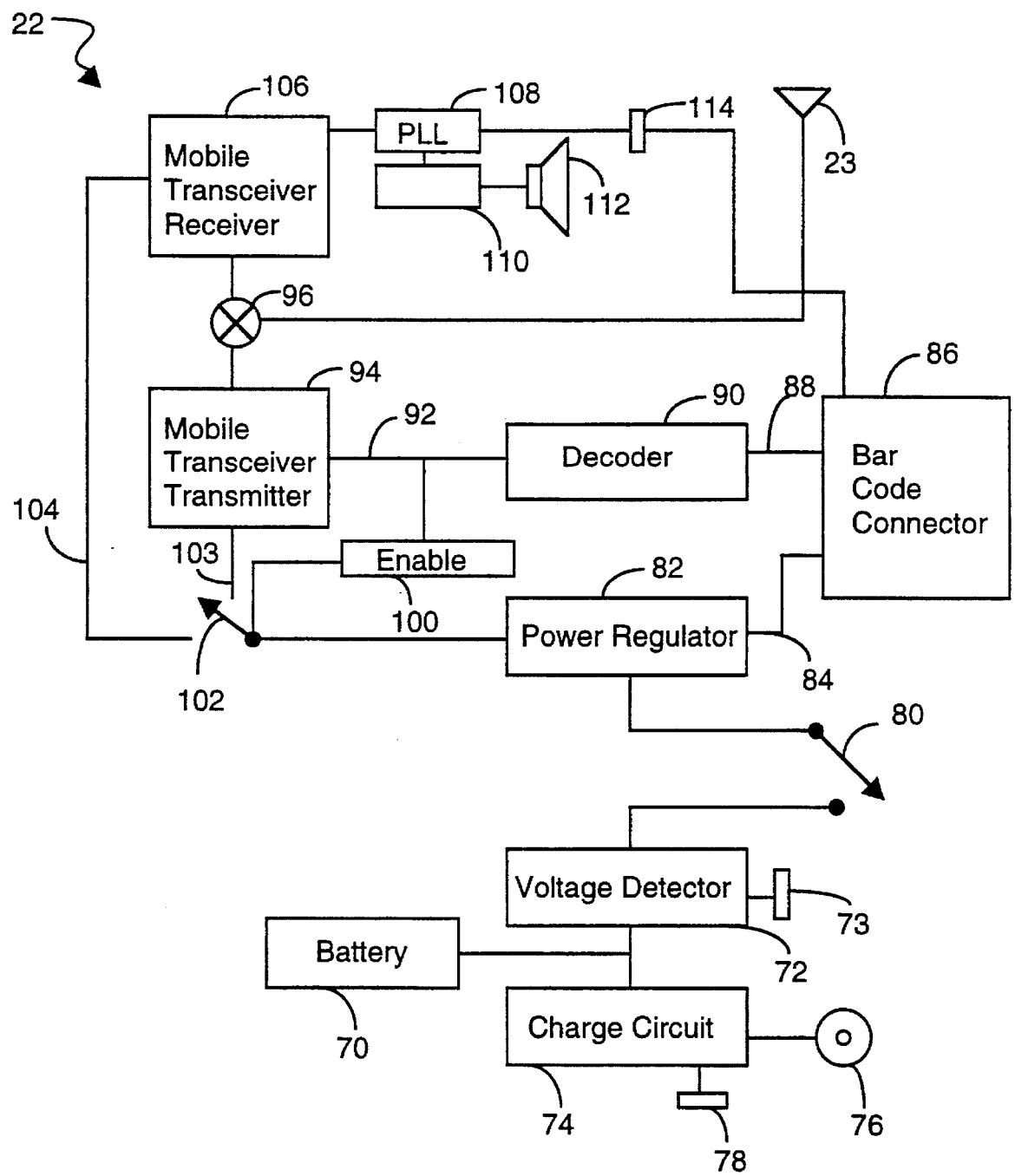
FIG. 3 illustrates the mobile transceiver of the apparatus of FIG. 1.

Attention now turns to the apparatus of the invention. FIG. 3 illustrates an embodiment 22 of a mobile transceiver incorporating the invention. The mobile transceiver 22 is powered by a battery 70. Preferably, the battery 70 is accompanied by a voltage detector 72 that has an associated voltage detector indicator 73 to identify when there is a low charge on the battery 70. In a preferred embodiment, the mobile transceiver 22 also includes a charge circuit 74 with an associated external charge interface 76 and charge circuit indicator 78. The external charge interface 76 is used to provide an external connection to a power source that is used to re-charge the battery 70.

A power switch 80 is used to electrically couple the battery 70 to the remaining portions of the mobile transceiver 22. Specifically, the switch 80 electrically connects the battery 70 to a mobile transceiver power regulator 82. The power regulator 82 provides a power signal over connector power line 84 to a bar code connector 86.

Bar code connector 86 is a standard connector that is typically provided at a bar code wedge 28. A standard D9 connector may be used for this purpose. Using a D9 connector, pin 2 may be designated as a data pin, pin 9 may be designated as a power input, pins 7 and 8 may be designated ground pins, and the remaining pins can be unassigned. Power from the battery 70 is provided through the power regulator 82 over the connector power line 84 to pin 9 of the bar code connector 86. In this configuration, the bar code reader 24 is powered through the mobile transceiver 22.

A decoder data line 88 is connected to the data pin of the bar code connector 86. The decoder 90 uses standard techniques to convert the sequence of varying width digital high and low signals from the bar code connector 86 to bar code format signals. The bar code format signals are then applied to a mobile transceiver transmitter 94 over decoder output line 92. The mobile transceiver transmitter 94 modulates the bar code format signals on to a radio frequency carrier to produce wireless bar code signals that are passed through a duplex mixer 96 to antenna 23.

A mobile transceiver enable circuit 100 is triggered by signals on the decoder output line 92. The enable circuit drives the mobile transceiver receiver switch 102 from the transmitter power line 103 to the receiver power line 104. The position of the mobile transceiver receiver switch 102 determines whether the mobile transceiver transmitter 94 or the mobile transceiver receiver 106 receives power from the power regulator 82.

The mobile transceiver enable circuit 100 connects switch 102 to the receiver power line for a predetermined period of time that is sufficient to receive an acknowledgement signal. Thus, the mobile transceiver receiver 106 is only active for relatively short periods of time.

Preferably, the enable circuit 100 is triggered at the end of a stream of bar code format signals on line 92. The end of a stream of bar code format signals may be recognized when an extended duration digital high or low signal is observed on the decoder output line 92, thereby indicating that no data is being generated by the bar code reader. The enable circuit 100 should include a data delay gate to produce a small delay period (approximately 100 milliseconds) to assure switch 102 is not moved before the mobile transceiver transmitter 94 has stopped transmitting wireless bar code signals.

The enable circuit 100 also includes a single-shot timer set to approximately 500 milliseconds. The timer is triggered at the same time as the data delay gate. The timer provides an output strobe that connects the receiver switch 102 and the receiver power line 104 for approximately 400 milliseconds.

The mobile transceiver receiver 106 is connected to a phase-locked loop 108 that is set to the frequency designated for the acknowledge signal. If the receiver 106 picks-up an acknowledge signal, phase-locked loop 108 triggers a tone generator 110 and a good read LED driver 114. Tone generator 110 activates a speaker 112. The phase-locked loop signal from the good read LED driver 114 is conveyed to the bar code connector 86 so that a good read LED on the scan gun may be activated.

Figure 4:
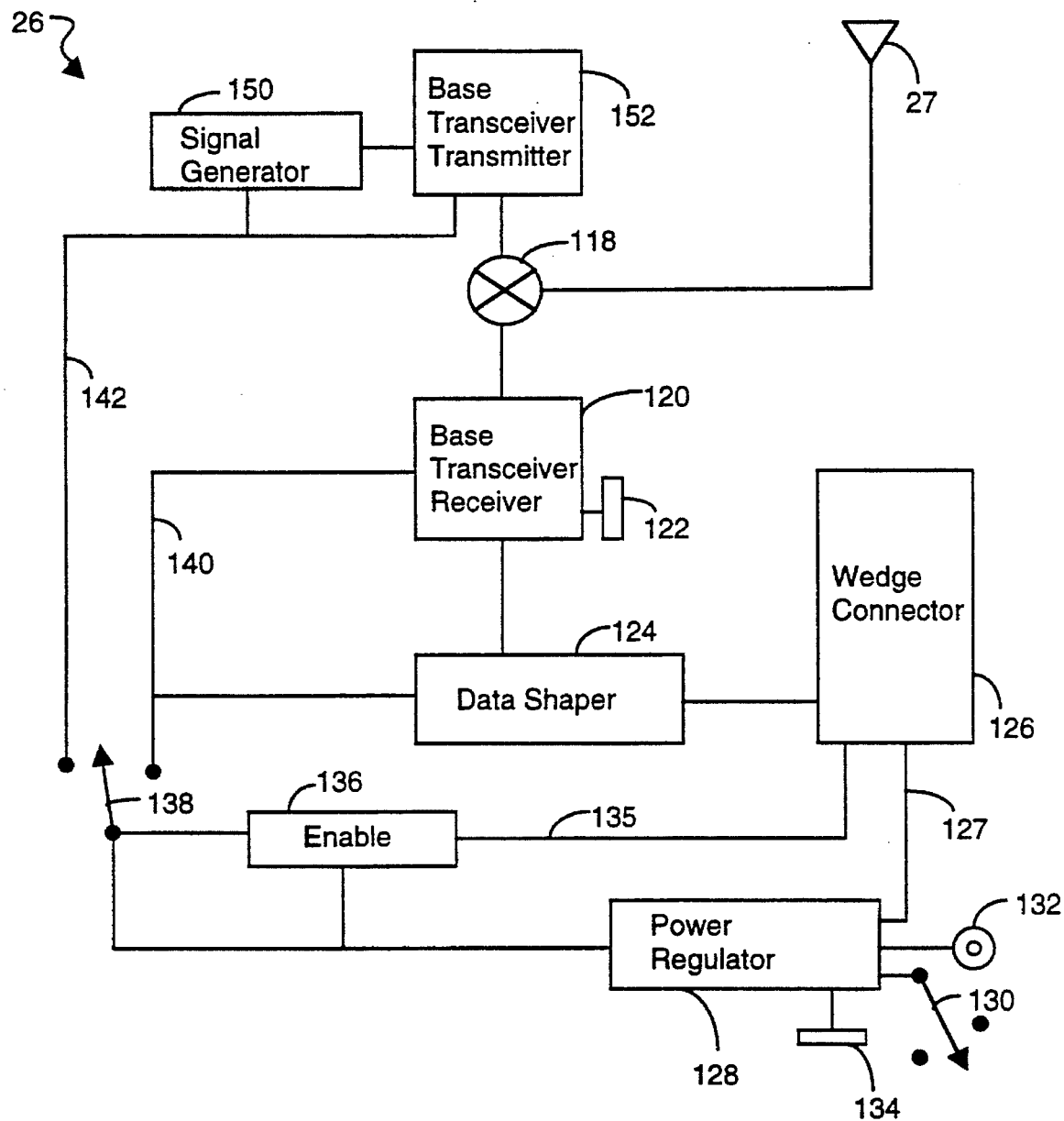
FIG. 4 illustrates the base transceiver of the apparatus of FIG. 1.

FIG. 4 illustrates the base transceiver 26 of the invention. The antenna 27 is connected to a duplex mixer 118 that routes the wireless bar code signals to the base transceiver receiver 120. The operation of the receiver 120 may be identified with a base transceiver receiver indicator 122. The demodulated signal from the receiver 120 is routed to a data shaper 124. The data shaper 124 must amplify and hard limit the demodulated signal from receiver 120. The phase demodulator in receiver 120 is adjusted for the proper phase, whereby its phase is consistent with the pre-transmission bar code signal. The output from the data shaper 124 is then applied to the wedge connector 126. The wedge connector 126 is preferably a standard D9 connector with designated data, ground, and power pins. The output of the data shaper 124 is applied to the data pin of the wedge connector 126. From the wedge connector 126, the data signal is sent through the bar code wedge 28 to the computer 30.

The power pin of the wedge connector 126 is connected to a wedge connector power line 127 that is connected to a power regulator 128. In this configuration, when the power switch 130 is turned on, the base transceiver receives its power through the wedge connector 126, in other words, from the bar code wedge 28. In the alternative, the power regulator 128 may be supplied through a power plug 132.

The bar code wedge 28 applies a valid data signal to the wedge connector 126. The valid data signal is applied to the wedge output line 135. In response to the valid data signal, a base transceiver enable circuit 136 is triggered. The enable circuit 136 may be implemented as a 500 millisecond on-shot integrated circuit that forces a transmitter enable switch 138 from connection to the receiver power line 140 to connection to the transmitter power line 142.

The power signal on the transmitter power line 142 activates a signal generator 150 that generates an acknowledge signal that is passed to a base transceiver transmitter 152. The base transceiver transmitter 152 generates a corresponding wireless acknowledge signal. Processing of the wireless acknowledge signal by the mobile transceiver 22 has been described.

As previously indicated, the apparatus of the invention may be combined with an exist bar code inventory system. The bar code reader 24 used in conjunction with the invention may be a Scan Gun PSC 5310, sold by Photographic Science Corporation, Webster, N.Y. The bar code wedge 28 may be the Quick Reader™ bar code wedge reader sold by Compsee Corporation, Mount Gilead, N.C. The invention may be used with essentially any computer 30.

The preferred embodiment of the invention was implemented using the known code of 39 bar code format. The decoder 90 of the mobile transceiver 22 may use standard techniques to convert the bar code digital pulses to the code of 39 bar code format. The invention was implemented using the A034-U-201 bar code decoder sold by Dynasys Corporation, Clearwater, Fla. Any similar Hand Held Laser Code (HHLC) decoder may be used.

The base transceiver 26 and mobile transceiver 22 have been implemented to operate in the 50 to 950 MHz frequency range. The speaker 112 of the mobile transceiver 22 may be substituted with a visual light, an LCD prompt, a synthesized voice prompt, or a vibrating device. In any embodiment, the indicating device is activated by the acknowledge signal.

The mobile transceiver 22 was implemented using a 7.2 V DC battery 70. The low voltage detector indicator was set to go on at 6.7 V DC.

The foregoing descriptions of specific embodiments of the present invention are presented for purposes of illustration and description. They are not intended to be exhaustive or to limit the invention to the precise forms disclosed. Obviously, many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A bar code data exchange apparatus, comprising:
   A) a mobile transceiver including:
      i. a bar code connector for connection to a bar code reader that generates a set of digital output signals corresponding to bar code markings,
      ii. a decoder connected to said bar code connector to convert said set of digital output signals to bar code format signals corresponding to said digital output signals,
      iii. a mobile transceiver transmitter connected to said decoder to receive said bar code format signals and transmit wireless bar code signals corresponding to said bar code format signals;
      iv. a mobile transceiver receiver, and
      v. a mobile transceiver enable circuit to enable said mobile transceiver receiver for a predetermined period of time after said wireless bar code format signals are transmitted, B) a base transceiver including:
  i. a base transceiver receiver to receive said wireless bar code signals,
  ii. a connector connectable between said base transceiver receiver and a bar code interface device to convey said wireless bar code signals to said interface device for transformation into a character set that can be processed subsequently at a computer,
  iii. a signal generator to produce an acknowledge signal,
  iv. a base transceiver transmitter to transmit during said predetermined time a wireless acknowledge signal corresponding to said acknowledge signal, and
  v. a base transceiver enable circuit to activate said signal generator and said transmitter in response to receipt of a valid wireless bar code format signal.

2. The apparatus of claim 1 wherein said mobile transceiver includes:
  a battery;
  a power regulator connected to said battery; and
  a connector power line connected between said power regulator and said bar code connector to provide a power signal to said bar code connector that may be used by said bar code reader.

3. The apparatus of claim 1 wherein said base transceiver includes:
  a power regulator; and
  an interface device power line connector and said power regulator to carry power received from said connector to said power regulator.

4. A retrofit apparatus to be connected to an existing bar code inventory system of the type that includes a bar code reader to generate a set of digital output signals corresponding to bar code markings, an interface device to transform said digital output signals into corresponding computer data characters, and a computer connected to said interface device to process said computer data characters, the apparatus comprising:
  a mobile transceiver connectable to said bar code reader to transmit wireless bar signals, said transceiver including:
    i. a decoder to transform said digital output signals from said bar code reader to bar code format signals; and
    ii. a mobile transceiver transmitter connected to said decoder to transmit said wireless bar code format signals; and
  a base transceiver connected to said interface device to receive said wireless bar code format signals and link them to said interface device.

5. The apparatus of claim 4 wherein said mobile transceiver includes:
  a mobile transceiver receiver; and
  a mobile transceiver enable circuit to enable said mobile transceiver receiver for a predetermined period of time after said wireless bar code signals are transmitted.

6. The apparatus of claim 5 wherein said base transceiver includes:
  a base transceiver receiver to receive said wireless bar code signals;
  a signal generator to produce an acknowledge signal;
  a base transceiver transmitter to transmit a wireless acknowledge signal during said predetermined period of time; and
  a base transceiver enable circuit to activate said signal generator and said transmitter upon receipt of a valid wireless bar code signal.

7. The apparatus of claim 4 wherein said base transceiver includes:
  an interface device for connection to said bar code wedge;
  a power regulator; and
  an interface device power line connected between said interface device and said power regulator to deliver power from said interface device to said power regulator.

8. The apparatus of claim 4 wherein said mobile transceiver includes:
  a bar code connector for connection to said bar code reader;
  a battery;
  a power regulator connected to said battery; and
  a connector power line connected between said power regulator and said bar code connector to provide a power signal to said bar code connector that may be used by said bar code reader.

9. A method of wirelessly exchanging data in a bar code inventory system of the type that includes a bar code reader to generate a set of digital output signals corresponding to bar code markings, an interface device to transform said digital output signals into corresponding computer data characters, and a computer connected to said interface device to process said computer data characters, the method comprising the steps of:
  converting said digital output signals from said bar code reader into wireless bar code format signals;
  transmitting said wireless bar code format signals from a mobile transceiver connected to said bar code reader;
  enabling a receiver of said mobile transceiver for a predetermined period of time after said transmitting step;
  receiving said wireless bar code format signals at a base transceiver;
  transmitting a wireless acknowledge signal from said base transceiver upon receipt of said wireless bar code format signals; and
  receiving said wireless acknowledge signal at said mobile transceiver during said predetermined period.

10. The method of claim 9 further comprising the step of powering said bar code reader with said mobile transceiver.

11. The method of claim 9 further comprising the step of powering said base transceiver with said interface device.

* * * * *